(12) United States Patent
Han et al.

(10) Patent No.: US 11,924,839 B2
(45) Date of Patent: Mar. 5, 2024

(54) DATA TRANSMISSION METHOD AND APPARATUS

(71) Applicant: HUAWEI TECHNOLOGIES CO., LTD., Shenzhen (CN)

(72) Inventors: Xiao Han, Shenzhen (CN); Yuchen Guo, Shenzhen (CN); Xun Yang, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 404 days.

(21) Appl. No.: 17/145,371

(22) Filed: Jan. 10, 2021

(65) Prior Publication Data

US 2021/0136803 A1 May 6, 2021

Related U.S. Application Data

(63) Continuation of application No. PCT/CN2019/095447, filed on Jul. 10, 2019.

(30) Foreign Application Priority Data

Jul. 11, 2018 (CN) .......................... 201810757968.7

(51) Int. Cl.
*H04W 72/12* (2023.01)
*H04W 56/00* (2009.01)
(Continued)

(52) U.S. Cl.
CPC ......... *H04W 72/21* (2023.01); *H04W 56/001* (2013.01); *H04W 72/0446* (2013.01);
(Continued)

(58) Field of Classification Search
CPC ... H04W 72/535; H04W 72/23; H04W 72/27; H04W 56/001; H04W 72/0453; H04W 72/0446; H04W 72/21; H04W 72/54
See application file for complete search history.

(56) References Cited

U.S. PATENT DOCUMENTS

2011/0244908 A1 10/2011 Morioka
2015/0016410 A1 1/2015 Lee et al.
(Continued)

FOREIGN PATENT DOCUMENTS

CN 105052235 A 11/2015
CN 106134249 A 11/2016
(Continued)

OTHER PUBLICATIONS

Office Action dated May 31, 2022 for Chinese Application No. CN 201810757968.7, 11 pages
(Continued)

*Primary Examiner* — Brian D Nguyen

(57) ABSTRACT

Various embodiments provide a data transmission method and apparatus. In those embodiments, a first device sends first indication information in a first frequency band, where the first indication information is indicative of a resource in a second frequency band, used by the first device and the second device to perform data transmission. In those embodiments, the first device performs, based on the scheduling information, data transmission with the second device, using the resource in the second frequency band. Those embodiments can schedule a device based on a plurality of frequency bands to perform data transmission. In this way, a larger bandwidth is used, a throughput rate is increased, and system performance is improved.

20 Claims, 11 Drawing Sheets

(51) Int. Cl.
  *H04W 72/04* (2023.01)
  *H04W 72/0446* (2023.01)
  *H04W 72/0453* (2023.01)
  *H04W 72/21* (2023.01)
  *H04W 72/27* (2023.01)
  *H04W 72/50* (2023.01)

(52) U.S. Cl.
  CPC ....... *H04W 72/0453* (2013.01); *H04W 72/27* (2023.01); *H04W 72/535* (2023.01)

(56) References Cited

U.S. PATENT DOCUMENTS

| | | | |
|---|---|---|---|
| 2015/0078298 A1 | 3/2015 | Barriac et al. | |
| 2016/0119927 A1* | 4/2016 | Hedayat | H04W 72/12 370/329 |
| 2016/0315681 A1* | 10/2016 | Moon | H04W 74/0816 |
| 2017/0359812 A1* | 12/2017 | Park | H04W 72/0453 |
| 2017/0373806 A1* | 12/2017 | Choi | H04W 84/12 |
| 2021/0176643 A1 | 6/2021 | Jang | H04W 16/10 |
| 2021/0195622 A1* | 6/2021 | Kim | H04W 72/0453 |
| 2021/0274484 A1* | 9/2021 | Park | H04W 72/0453 |

FOREIGN PATENT DOCUMENTS

| | | |
|---|---|---|
| CN | 107006006 A | 8/2017 |
| WO | 2017128176 A1 | 8/2017 |

OTHER PUBLICATIONS

IEEE Std 802.11—2016, IEEE Standard for Information technology Telecommunications and information exchange between systems, Local and metropolitan area networks Specific requirements. Part 11: Wireless LAN Medium Access Control (MAC) and Physical Layer (PHY) Specifications. 3534 pages.

Kerstin Johnsson, Distributed Scheduling Draft Text. IEEE P802.11 Wireless LANs, IEEE 802.11-17/1446r2, Sep. 2017, 3 pages.

IEEE P802.11ay/D1.2, Apr. 2018, Draft Standard for Information Technology-Telecommunications and Information, Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz. 581 pages.

\* cited by examiner

| Element ID | Duration | Element ID extension | Slot structure start time | Slot duration | Inter slot space | Quantity of slots | Slot structure end time | Time unit | Allocation type for each slot |
|---|---|---|---|---|---|---|---|---|---|
| 1 | 1 | 1 | 4 | 1 | 1 | 2 | 4 | 1 | [M*2/8] |

Octet

FIG. 3

DATA TRANSMISSION METHOD AND APPARATUS

CROSS-REFERENCE TO RELATED APPLICATIONS

This application is a continuation of International Application No. PCT/CN2019/095447, filed on Jul. 10, 2019, which claims priority to Chinese Patent Application No. 201810757968.7, filed on Jul. 11, 2018. The aforementioned applications are hereby incorporated by reference in their entireties.

TECHNICAL FIELD

This application relates to the communications field, and more For example, to a data transmission method and apparatus.

BACKGROUND

A wireless local area network (WLAN) usually works in an unlicensed spectrum, and frequency bands are mainly classified into 1 GHz, 2.4 GHz, 5 GHz, 6 GHz, and the like. Some mainstream WLAN standards usually occupy the 2.4 GHz frequency band or the 5 GHz frequency band. With development of technologies, a 6 GHz unlicensed spectrum may also be used as an operating spectrum subsequently.

Air interface transmission exhibits different features based on different frequency bands. For a low frequency, wireless transmission features relatively slow signal attenuation and a good wall penetration effect. However, a spectrum is relatively limited, and a rate is sometimes limited by a value of the spectrum. For example, at 2.4 GHz, a basic bandwidth of a data group is 20 MHz, and the data group supports a maximum of 40 MHz. In addition, there are some overlaps between all channels, and the overlaps affect a continuous use of a plurality of channels. Compared with a spectrum resource at relatively congested 2.4 GHz, spectrum resources in the 5 GHz frequency band and the 6 GHz frequency band are more abundant, and are more suitable for high-bandwidth (for example, 320 MHz) and high-rate data transmission.

In a scenario in which a plurality of frequency bands such as 2.4 GHz, 5 GHz, and 6 GHz can be simultaneously used for working, currently, there is no solution to coordinated data transmission of the plurality of frequency bands. Therefore, how to perform data transmission for a plurality of frequency band scheduling devices becomes a technical problem that urgently needs to be resolved.

SUMMARY

Various embodiments can provide a data transmission method and apparatus. The data transmission method and apparatus can schedule a device based on a plurality of frequency bands to perform data transmission.

According to a first aspect, a data transmission method is provided, and includes: A first device sends scheduling information to a second device in a first frequency band, where the scheduling information is used to schedule the second device to perform data transmission in a second frequency band, the scheduling information carries first indication information, and the first indication information is used to indicate a resource used by the first device and the second device to perform data transmission; and the first device performs, based on the scheduling information, data transmission with the second device in the second frequency band by using the resource.

For example, the first device may schedule, in the first frequency band, the second device to perform data transmission in the second frequency band. The first frequency band may be one or more of a plurality of frequency bands, and the second frequency band may also be one or more of a plurality of frequency bands, for example, one or more frequency bands in 2.4 GHz, 5 GHz and 6 GHz. This is not limited in this embodiment. In addition, the first frequency band may be a frequency band different from the second frequency band, or may be the same frequency band as the second frequency band. This is not limited in this embodiment either. In one implementation, the first frequency band is 2.4 GHz or 5 GHz, and the second frequency band is 6 GHz.

It should be understood that the first device may send the scheduling information in a broadcast manner, or may send the scheduling information in a unicast manner. This is not limited in this embodiment. The second device may include one device, or may include a plurality of devices. For example, the first device may schedule, in the broadcast manner, a plurality of devices to perform data transmission, or may separately send the scheduling information to each of the plurality of devices. For different sending scenarios, specific formats of the scheduling information in this application may be different, and are described in detail in subsequent embodiments.

In the data transmission method in this embodiment, the first device schedules, in the first frequency band, the second device to perform data transmission in the second frequency band, so that a device can be scheduled based on a plurality of frequency bands to perform data transmission. In this way, a larger bandwidth is used, a throughput rate is increased, and system performance is improved.

With reference to the first aspect, in some implementations of the first aspect, before that a first device sends scheduling information to a second device in a first frequency band, the method further includes: the first device determines the scheduling information based on at least one of the following information: uplink and downlink service information in a first basic service set to which the first device belongs; a quantity of neighboring devices that are in neighboring devices of the first device and that support and/or are working in the second frequency band in a scheduling manner; interference information in the first basic service set; interference information between the first basic service set and a second basic service set; and a resource allocation rule between the first basic service set and the second basic service set, where the second basic service set includes a basic service set that performs resource sharing with the first basic service set.

In this application, a basic service set to which the first device belongs is referred to as the first basic service set (also referred to as this BSS in this specification), and a basic service set neighboring to the first basic service set is referred to as the second basic service set. To be specific, the second basic service set is an OBSS of the first basic service set, and resource sharing may be performed between the first basic service set and the second basic service set. It should be understood that there may be one or more second basic service sets. This is not limited in this embodiment.

In this embodiment, the first device may determine, based on the uplink and downlink service information in the first basic service set, how to schedule the second device, where the uplink and downlink service information may be uplink and downlink service volumes of each STA in the first basic service set and a service type of the STA. In one implementation, the first device may allocate and schedule more resources to a STA with a large service volume and a high service type priority.

The first device may further determine, based on the quantity of neighboring devices that are in the neighboring devices and that support and/or are working in the second frequency band in the scheduling manner, how to schedule the second device. For example, if a quantity of neighboring devices that are working in the second frequency band in the scheduling manner is less than a threshold, the first device determines to schedule the second device; if a quantity of neighboring devices that are working in the second frequency band in the scheduling manner exceeds a threshold, the first device determines not to schedule (or temporarily not to schedule) the second device, to ensure normal working of another device. In one implementation, the neighboring device may be an AP.

The first device may further determine, based on the interference information in the first basic service set, how to schedule the second device. For example, in the first basic service set, when an AP 1 is scheduled to communicate with a STA 1, a STA 2 may be scheduled to communicate with a STA 3 at the same time, provided that interference caused by the communication between the STA 2 and the STA 3 to the communication between the AP 1 and the STA 1 is relatively small, for example, less than a threshold, and the threshold may be an OBSS packet detection level (OBSS PD level).

The first device may further determine, based on the interference information between the first basic service set and the second basic service set, how to schedule the second device. For example, the AP 1 and the STA 1 belong to the first basic service set, and an AP 2 and the STA 2 belong to the second basic service set. Because scheduling resources of the first basic service set and the second basic service set can be shared, the AP 1 may be scheduled to communicate with the STA 1 on a resource, and the AP 2 may be scheduled to communicate with the STA 2 on the same resource at the same time, provided that interference caused by the communication between the AP 2 and the STA 2 to the communication between the AP 1 and the STA 1 is relatively small, for example, less than a threshold, and the threshold may be an OBSS PD level.

The first device may further determine, based on the resource allocation rule between the first basic service set and the second basic service set, how to schedule the second device. The resource allocation rule may be a predefined rule, for example, that a resource used by the first basic service set does not exceed a threshold, or a function related to a quantity of the second basic service sets. This is not limited in this embodiment.

It should be understood that the first device may determine the scheduling information in any one of the foregoing manners, or may determine the scheduling information based on any combination of a plurality of the foregoing manners. This is not limited in this embodiment.

It should be further understood that the foregoing "working in the second frequency band in a scheduling manner" may also be referred to as "using a scheduling protocol in the second frequency band" or "joining a network that uses a scheduling protocol in the second frequency band". However, it should be understood that this is merely an example name for ease of description, and this is not limited in this application.

With reference to the first aspect, in some implementations of the first aspect, the resource allocation rule is that a resource used by the first basic service set does not exceed $1/(N+1)$ of a resource used for sharing, N is a quantity of basic service sets that perform resource sharing with the first basic service set, and N is a positive integer.

For example, if the quantity of basic service sets that perform resource sharing with the first basic service set is N, the resource allocation rule may be that the resource used by the first basic service set does not exceed $1/(N+1)$ of the resource used for sharing. In other words, the resource used by the first basic service set does not exceed a resource amount obtained by evenly allocating the resource used for sharing to all basic service sets participating in the resource sharing. The resource used for sharing may also be a total resource. In one implementation, the resource used for sharing may be a corresponding resource calculated in a unit of a beacon interval (Beacon interval). Generally, a beacon interval is configured as 100 ms.

With reference to the first aspect, in some implementations of the first aspect, the resource allocation rule includes any one of the following rules: a bandwidth corresponding to the first basic service set does not exceed $1/(N+1)$ of a bandwidth used for sharing; a time corresponding to the first basic service set does not exceed $1/(N+1)$ of a time used for sharing; and a quantity of slots corresponding to the first basic service set does not exceed $1/(N+1)$ of a quantity of slots used for sharing.

With reference to the first aspect, in some implementations of the first aspect, the method further includes: The first device receives second indication information from the neighboring device, where the second indication information includes at least one of the following information: information used to indicate that the neighboring device supports and/or is working in the second frequency band in the scheduling manner, time synchronization information of the neighboring device, slot alignment information of the neighboring device, and interference measurement information of the neighboring device.

For example, the first device may further receive the second indication information from the neighboring device. In some embodiments, the second indication information may be a plurality of pieces of information from a plurality of neighboring devices. The second indication information may include the information used to indicate that the neighboring device supports and/or is working in the second frequency band in the scheduling manner, so that the first device determines a quantity of neighboring devices that support and/or are working in the second frequency band in the scheduling manner. The second indication information may include the time synchronization information of the neighboring device, so that the first device performs time synchronization based on the time synchronization information. The second indication information may include the slot alignment information of the neighboring device, so that the first device determines a specific slot location of the scheduling information based on the slot alignment information. The second indication information may further include interference information (namely, the interference information between the first basic service set and the second basic service set) of the neighboring device, so that the first device determines, based on the interference information, how to allocate a resource to the second device.

In one implementation, the second indication information may be carried in a beacon (Beacon), or may be carried in another frame that is sent after the beacon. The first device may obtain the second indication information by listening to a channel for a period of time. This is not limited in this embodiment.

It should be understood that, when the first device obtains the second indication information in a listening manner, the first device may listen to a plurality of different channels. This is because the beacon (or another frame that is sent after the beacon) is usually sent (for example, broadcast) by a sending device on a primary channel (primary channel). The first device may have a plurality of neighboring devices, and each of the plurality of neighboring devices may correspond to a different primary channel. Therefore, to ensure that the second indication information sent by the plurality of neighboring devices is obtained, the first device may listen to the plurality of different channels.

With reference to the first aspect, in some implementations of the first aspect, the method further includes: The first device sends third indication information, where the third indication information includes at least one of the following information: information used to indicate that the first device supports and/or is working in the second frequency band in the scheduling manner, time synchronization information of the first device, slot alignment information of the first device, and interference measurement information of the first device.

With reference to the first aspect, in some implementations of the first aspect, the third indication information is sent by using a primary channel of the first device and/or a primary channel of the neighboring device of the first device.

For example, the first device may send the third indication information on the primary channel of the first device, or may send the third indication information on the primary channel of the neighboring device of the first device, so that the neighboring device can obtain the third indication information in time. When there are a plurality of neighboring devices, the neighboring devices may correspond to a plurality of primary channels. The first device may simultaneously send the third indication information on the plurality of primary channels, or may send the third indication information on the plurality of primary channels in a specific sequence. This is not limited in this embodiment.

In some embodiments, the first device may send the third indication information on all channels on which the first device can work. For example, the first device may simultaneously send the third indication information on all the channels on which the first device can work, or may send the third indication information on all the channels in a specific sequence.

With reference to the first aspect, in some implementations of the first aspect, before that a first device sends scheduling information to a second device in a first frequency band, the method further includes: The first device receives request information from the second device, where the request information is used to request to perform data transmission in the second frequency band; and that a first device sends scheduling information to a second device in a first frequency band includes: The first device sends the scheduling information to the second device in the first frequency band based on the request information.

For example, the first device may schedule, based on a request of the second device, the second device to communicate in the second frequency band. In this way, an effect of active reservation is achieved.

With reference to the first aspect, in some implementations of the first aspect, the request information includes at least one of the following information: a service type requested by the second device and/or a quantity of resources required by the second device in the second frequency band.

According to a second aspect, another data transmission method is provided, and includes: A second device receives scheduling information from a first device in a first frequency band, where the scheduling information is used to schedule the second device to perform data transmission in a second frequency band, the scheduling information carries first indication information, and the first indication information is used to indicate a resource used by the first device and the second device to perform data transmission; and the second device performs, based on the scheduling information, data transmission with the first device in the second frequency band by using the resource.

With reference to the second aspect, in some implementations of the second aspect, the method further includes: The second device sends fifth indication information, where the fifth indication information includes at least one of the following information: information used to indicate that the second device supports and/or is working in the second frequency band in a scheduling manner, time synchronization information of the second device, slot alignment information of the second device, and interference measurement information of the second device.

With reference to the second aspect, in some implementations of the second aspect, the fifth indication information is sent by using a primary channel of the second device and/or a primary channel of a neighboring device of the second device.

With reference to the second aspect, in some implementations of the second aspect, before that a second device receives scheduling information from a first device in a first frequency band, the method further includes: The second device sends request information to the first device, where the request information is used to request to perform data transmission in the second frequency band.

With reference to the second aspect, in some implementations of the second aspect, the request information includes at least one of the following information: a service type requested by the second device and a quantity of resources required by the second device in the second frequency band.

According to a third aspect, a data transmission apparatus is provided, and is configured to perform the method according to any one of the first aspect or the possible implementations of the first aspect. For example, the apparatus includes a unit configured to perform the method according to any one of the first aspect or the possible implementations of the first aspect.

According to a fourth aspect, another data transmission apparatus is provided, and is configured to perform the method according to any one of the second aspect or the possible implementations of the second aspect. For example, the apparatus includes a unit configured to perform the method according to any one of the second aspect or the possible implementations of the second aspect.

According to a fifth aspect, another data transmission apparatus is provided, and the apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the first aspect or the possible implementations of the first aspect.

According to a sixth aspect, another data transmission apparatus is provided, and the apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the second aspect or the possible implementations of the second aspect.

According to a seventh aspect, a data transmission system is provided, and the system includes the apparatus according to any one of the third aspect or the possible implementations of the third aspect and the apparatus according to any one of the fourth aspect or the possible implementations of the fourth aspect; or the system includes the apparatus according to any one of the fifth aspect or the possible implementations of the fifth aspect and the apparatus according to any one of the sixth aspect or the possible implementations of the sixth aspect.

According to an eighth aspect, a computer program product is provided, and the computer program product includes computer program code. When the computer program code is run on a computer, the computer is enabled to perform the methods according to the foregoing aspects.

According to a ninth aspect, a computer-readable medium is provided, and is configured to store a computer program, and the computer program includes an instruction used to perform the method according to the foregoing aspects.

According to a tenth aspect, a chip system is provided, and includes an input interface, an output interface, at least one processor, and a memory. The input interface, the output interface, the processor, and the memory are connected to each other by using an internal connection path, and the processor is configured to execute code in the memory. When the code is executed, the processor is configured to perform the methods according to the foregoing aspects.

BRIEF DESCRIPTION OF DRAWINGS

FIG. 3 is a schematic structural diagram of scheduling information according to an embodiment of this application;

DESCRIPTION OF EMBODIMENTS

Figure 1:
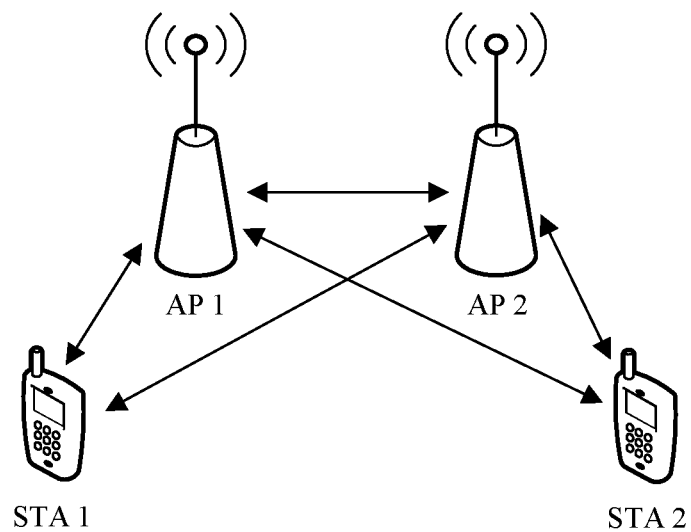
FIG. 1 is a schematic diagram of a communications system according to an embodiment of this application.

The following describes technical solutions in this application with reference to accompanying drawings.

The technical solutions in embodiments in accordance with the disclosure may be used in various communications systems, for example, a wireless local area network (WLAN) system. In some embodiments, the embodiments of this application may be further used in another system, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a 5th generation (5G) system, or a new radio (NR) system.

The following uses only a WLAN system as an example to describe an application scenario of the embodiments of this application and a method in the embodiments of this application.

For example, the embodiments of this application may be used in a wireless local area network (WLAN), and the embodiments of this application may be used in any one of the institute of electrical and electronics engineers (IEEE) 802.11 series protocols currently used for the WLAN. The WLAN may include one or more basic service sets (BSS). A network node in the basic service set includes an access point (AP) and a station (STA). Based on an original BSS, a personal basic service set (PBSS) and a personal basic service set control point (PCP) are introduced into the IEEE 802.11ad. Each personal basic service set may include an AP/PCP and a plurality of stations associated with the AP/PCP.

For example, in the embodiments of this application, a first device and/or a second device may be a user station (STA) in the WLAN. The user station may also be referred to as a system, a subscriber unit, an access terminal, a mobile station, a remote station, a remote terminal, a mobile device, a user terminal, a terminal, a wireless communications device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device with a wireless local area network (for example, Wi-Fi) communication function, a wearable device, a computing device, or another processing device connected to a wireless modem.

In addition, the first device and/or the second device in the embodiments of this application may alternatively be an AP/PCP in the WLAN. The AP/PCP may be configured to communicate with the access terminal by using the wireless local area network, and transmit data of the access terminal to a network side, or transmits data from a network side to the access terminal.

In various embodiments in accordance with the disclosure, the first device or the second device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of the method provided in the embodiments of this application is not particularly limited in the embodiments of this application, provided that communication can be performed according to the method provided in the embodiments of this application by running a program that records code of the method provided in the embodiments of this application. For example, the method provided in the embodiments of this application may be executed by the AP or the STA, or may be performed by a function module that can invoke a program and execute the program and that is in the AP or the STA.

In addition, aspects or features of this application may be implemented as a method, an apparatus or a product that uses standard programming and/or engineering technologies. The term "product" used in this application covers a computer program that can be accessed from any computer readable component, carrier or medium. For example, a computer-readable medium may include but is not limited to: a magnetic storage component (for example, a hard disk, a floppy disk or a magnetic tape), an optical disc (for example, a compact disc (CD) or a digital versatile disc (DVD)), and a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, contain, and/or carry an instruction and/or data.

FIG. 1 is a schematic diagram of an application scenario according to an embodiment of this application. The scenario system shown in FIG. 1 may be a WLAN system. The WLAN system in FIG. 1 may include one or more AP/PCPs and one or more STAs. In FIG. 1, two APs (an AP 1 and an AP 2) and two STAs (a STA 1 and a STA 2) are used as an example. Wireless communication may be performed between APs, between an AP and a STA, and between STAs by using various standards.

It should be understood that communication in this specification may be direct communication, or may be indirect communication. This is not limited in this embodiment. For example, assuming that the STA 2 does not belong to a basic service set of the AP 1, the AP 1 may first send information to the AP 2, and then the AP 2 sends the information to the STA 2. In this way, indirect communication between the AP 1 and the STA 2 is implemented. Similarly, the STA 1 and the STA 2 may also perform indirect communication by using the AP 1 or the AP 2, and details are not described herein again.

For example, wireless communication between an AP and a STA may be performed by using a single-user multiple-input multiple-output (SU-MIMO) technology or a multi-user multiple-input multiple-output (MU-MIMO) technology. In this embodiment, each STA is equipped with one or more antennas. Each AP supports parallel uplink transmission of a plurality of stations. For example, the STA or the AP includes an antenna with an adjustable beam, a radio frequency (RF) channel corresponding to the antenna, a signal processing module, a protocol module, and the like.

A connection between the antenna and the radio frequency channel may be a specified connection, or may be a switchable connection. The radio frequency channel is connected to the signal processing module, to perform digital-to-analog or analog-to-digital conversion, and process signal transmission and reception. The signal processing module may generate a reference signal for measurement, receive the reference signal, and estimate signal strength, estimate channel quality, or estimate a channel coefficient. The signal processing module is further connected to a local clock source to modulate a signal to a target frequency band or demodulate a signal. The local clock source may further provide time reference to when to send a specified protocol data unit (PPDU). The signal processing module may trigger sending of the specified PPDU at a specified time. The signal processing module is further connected to the protocol module, to perform packet encapsulation and decapsulation, and execute a packet transceiving sequence agreed on in a protocol, where the packet transceiving sequence execution includes sending a training frame, receiving a training frame, replying with a response frame, and the like. The signal processing module or the protocol module may further indicate a beam used by the antenna during transmission or reception.

In some embodiments, the STA or the AP in this embodiment may further include an external interface module. This embodiment is not limited thereto.

The following first briefly describes some concepts or terms in this application.

1. Basic Service Set (BSS)

A basic service set is a basic component of an 802.11 local area network. A BSS includes an access point (AP) and a plurality of stations (STA). All STAs can directly communicate with each other in this BSS, but when communicating with a STA outside this BSS, all the STAs need to use the AP in this BSS.

2. Overlapping Basic Service Set (OBSS)

Because more and more wireless local area networks are deployed in a dense environment including a plurality of BSSs, neighboring BSSs inevitably overlap in an area, and an overlapping basic service set OBSS is formed. Therefore, an OBSS of a BSS may also be understood as a neighboring BSS of the BSS.

It should be understood that a resource can be shared between OBSSs. The resource in this application may be time, frequency, space, spreading code, or the like.

Figure 2:
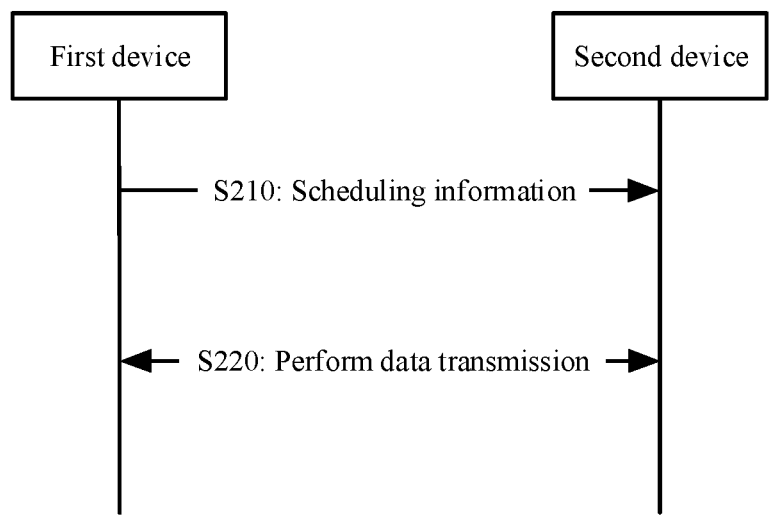
FIG. 2 is an example flowchart of a data transmission method according to an embodiment of this application.

FIG. 2 is an example flowchart of a data transmission method 200 according to an embodiment. It should be understood that a first device in the method shown in FIG. 2 may correspond to the AP or the STA in the system shown in FIG. 1, and a second device may also correspond to the AP or the STA shown in FIG. 1.

S210: The first device sends scheduling information to the second device in a first frequency band; and correspondingly, the second device receives the scheduling information from the first device in the first frequency band. The scheduling information is used to schedule the second device to perform data transmission in a second frequency band, the scheduling information carries first indication information, and the first indication information is used to indicate a resource used by the first device and the second device to perform data transmission.

S220: The first device performs, based on the scheduling information, data transmission with the second device in the second frequency band by using the resource; and correspondingly, the second device performs, based on the scheduling information, data transmission with the first device in the second frequency band by using the resource.

For example, the first device may schedule, in the first frequency band, the second device to perform data transmission in the second frequency band. The first frequency band may be one or more of a plurality of frequency bands, and the second frequency band may also be one or more of a plurality of frequency bands, for example, one or more frequency bands in 2.4 GHz, 5 GHz and 6 GHz. This is not limited in this embodiment. In addition, the first frequency band may be a frequency band different from the second frequency band, or may be the same frequency band as the second frequency band. This is not limited in this embodiment either. In one implementation, the first frequency band is 2.4 GHz or 5 GHz, and the second frequency band is 6 GHz.

It should be understood that the first device may send the scheduling information in a broadcast manner, or may send the scheduling information in a unicast manner. This is not limited in this embodiment. The second device may include one device, or may include a plurality of devices. For example, the first device may schedule, in the broadcast manner, a plurality of devices to perform data transmission, or may separately send the scheduling information to each of the plurality of devices. For different sending scenarios, specific formats of the scheduling information in this application may be different, and are described in detail in subsequent embodiments.

In the data transmission method in this embodiment, the first device schedules, in the first frequency band, the second device to perform data transmission in the second frequency band, so that a device can be scheduled based on a plurality of frequency bands to perform data transmission. In this way, a larger bandwidth is used, a throughput rate is increased, and system performance is improved.

In an implementation, before that the first device sends scheduling information to the second device in a first frequency band, the method further includes:

The first device determines the scheduling information based on at least one of the following information:
  uplink and downlink service information in a first basic service set to which the first device belongs;
  a quantity of neighboring devices that are in neighboring devices of the first device and that support and/or are working in the second frequency band in a scheduling manner;
  interference information in the first basic service set;
  interference information between the first basic service set and a second basic service set; and
  a resource allocation rule between the first basic service set and the second basic service set, where
  the second basic service set includes a basic service set that performs resource sharing with the first basic service set.

For example, a basic service set to which the first device belongs is referred to as the first basic service set (also referred to as this BSS in this specification), and a basic service set neighboring to the first basic service set is referred to as the second basic service set. To be specific, the second basic service set is an OBSS of the first basic service set, and resource sharing may be performed between the first basic service set and the second basic service set. It should be understood that there may be one or more second basic service sets. This is not limited in this embodiment.

In this embodiment, the first device may determine, based on the uplink and downlink service information in the first basic service set, how to schedule the second device, where the uplink and downlink service information may be uplink and downlink service volumes of each STA in the first basic service set and a service type of the STA. In one implementation, the first device may allocate and schedule more resources to a STA with a large service volume and a high service type priority.

The first device may further determine, based on the quantity of neighboring devices that are in the neighboring devices and that support and/or are working in the second frequency band in the scheduling manner, how to schedule the second device. For example, if a quantity of neighboring devices that are working in the second frequency band in the scheduling manner is less than a threshold, the first device determines to schedule the second device; if a quantity of neighboring devices that are working in the second frequency band in the scheduling manner exceeds a threshold, the first device determines not to schedule (or temporarily not to schedule) the second device, to ensure normal working of another device. In one implementation, the neighboring device may be an AP.

The first device may further determine, based on the interference information in the first basic service set, how to schedule the second device. For example, in the first basic service set, when an AP 1 is scheduled to communicate with a STA 1, a STA 2 may be scheduled to communicate with a STA 3 at the same time, provided that interference caused by the communication between the STA 2 and the STA 3 to the communication between the AP 1 and the STA 1 is relatively small, for example, less than a threshold, and the threshold may be an OBSS packet detection level (OBSS PD level).

The first device may further determine, based on the interference information between the first basic service set and the second basic service set, how to schedule the second device. For example, the AP 1 and the STA 1 belong to the first basic service set, and an AP 2 and the STA 2 belong to the second basic service set. Because scheduling resources of the first basic service set and the second basic service set can be shared, the AP 1 may be scheduled to communicate with the STA 1 on a resource, and the AP 2 may be scheduled to communicate with the STA 2 on the same resource at the same time, provided that interference caused by the communication between the AP 2 and the STA 2 to the communication between the AP 1 and the STA 1 is relatively small, for example, less than a threshold, and the threshold may be an OBSS PD level.

The first device may further determine, based on the resource allocation rule between the first basic service set and the second basic service set, how to schedule the second device. The resource allocation rule may be a predefined rule, for example, that a resource used by the first basic service set does not exceed a threshold, or a function related to a quantity of the second basic service sets. This is not limited in this embodiment.

It should be understood that the first device may determine the scheduling information in any one of the foregoing manners, or may determine the scheduling information based on any combination of a plurality of the foregoing manners. This is not limited in this embodiment.

It should be further understood that the foregoing "working in the second frequency band in a scheduling manner" may also be referred to as "using a scheduling protocol in the second frequency band" or "joining a network that uses a scheduling protocol in the second frequency band". However, it should be understood that this is merely an example name for ease of description, and this is not limited in this application.

In one embodiment, the resource allocation rule is that a resource used by the first basic service set does not exceed 1/(N+1) of a resource used for sharing, N is a quantity of basic service sets that perform resource sharing with the first basic service set, and N is a positive integer.

For example, if the quantity of basic service sets that perform resource sharing with the first basic service set is N, the resource allocation rule may be that the resource used by the first basic service set does not exceed 1/(N+1) of the resource used for sharing. In other words, the resource used by the first basic service set does not exceed a resource amount obtained by evenly allocating the resource used for sharing to all basic service sets participating in the resource sharing. The resource used for sharing may also be a total resource. In one implementation, the resource used for sharing may be a corresponding resource calculated in a unit of a beacon interval (Beacon interval). Generally, a beacon interval is configured as 100 ms.

In one implementation, the quantity of neighboring devices that are in the neighboring devices and that support and/or are working in the second frequency band in the scheduling manner is N, namely, the quantity of basic service sets that perform resource sharing with the first basic service set.

In one implementation, the resource allocation rule includes any one of the following rules:
 a bandwidth corresponding to the first basic service set does not exceed 1/(N+1) of a bandwidth used for sharing;
 a time corresponding to the first basic service set does not exceed 1/(N+1) of a time used for sharing;
 a quantity of slots corresponding to the first basic service set does not exceed 1/(N+1) of a quantity of slots used for sharing; and
 a quantity of resource blocks corresponding to the first basic service set does not exceed 1/(N+1) of the bandwidth used for sharing multiplied by the quantity of slots used for sharing.

In one implementation, before that the first device sends scheduling information to the second device in a first frequency band, the method further includes:

The first device receives second indication information from the neighboring device, where the second indication information includes at least one of the following information:
 information used to indicate that the neighboring device supports and/or is working in the second frequency band in the scheduling manner, time synchronization information of the neighboring device, slot alignment information of the neighboring device, and interference measurement information of the neighboring device.

For example, the first device may further receive the second indication information from the neighboring device. In some embodiments, the second indication information may be a plurality of pieces of information from a plurality of neighboring devices. The second indication information may include the information used to indicate that the neighboring device supports and/or is working in the second frequency band in the scheduling manner, so that the first device determines a quantity of neighboring devices that support and/or are working in the second frequency band in the scheduling manner. The second indication information may include the time synchronization information of the neighboring device, so that the first device performs time synchronization based on the time synchronization information. The second indication information may include the slot alignment information of the neighboring device, so that the first device determines a specific slot location of the scheduling information based on the slot alignment information. The second indication information may further include interference information (namely, the interference information between the first basic service set and the second basic service set) of the neighboring device, so that the first device determines, based on the interference information, how to allocate a resource to the second device.

In one implementation, the second indication information may be carried in a beacon, or may be carried in another frame that is sent after the beacon. The first device may obtain the second indication information by listening to a channel for a period of time. This is not limited in this embodiment.

It should be understood that, when the first device obtains the second indication information in a listening manner, the first device may listen to a plurality of different channels. This is because the beacon (or another frame that is sent after the beacon) is usually sent (for example, broadcast) by a sending device on a primary channel. The first device may have a plurality of neighboring devices, and each of the plurality of neighboring devices may correspond to a different primary channel. Therefore, to ensure that the second indication information sent by the plurality of neighboring devices is obtained, the first device may listen to the plurality of different channels.

In one implementation, the method further includes: The first device sends third indication information, where the third indication information includes at least one of the following information:
 information used to indicate that the first device supports and/or is working in the second frequency band in the scheduling manner, time synchronization information of the first device, slot alignment information of the first device, and interference measurement information of the first device.

For example, the first device also needs to send related information of the first device to the neighboring device of the first device, so that the neighboring device of the first device can perform proper scheduling arrangement based on the third indication information.

In one embodiment, the third indication information is sent by using a primary channel of the first device and/or a primary channel of the neighboring device of the first device.

For example, the first device may send the third indication information on the primary channel of the first device, or may send the third indication information on the primary channel of the neighboring device of the first device, so that the neighboring device can obtain the third indication information in time. When there are a plurality of neighboring devices, the neighboring devices may correspond to a plurality of primary channels. The first device may simultaneously send the third indication information on the plurality of primary channels, or may send the third indication information on the plurality of primary channels in a specific sequence. This is not limited in this embodiment.

In some embodiments, the first device may send the third indication information on all channels on which the first device can work. For example, the first device may simultaneously send the third indication information on all the channels on which the first device can work, or may send the third indication information on all the channels in a specific sequence.

In one implementation, the method further includes: The second device sends fifth indication information, where the fifth indication information includes at least one of the following information:
  information used to indicate that the second device supports and/or is working in the second frequency band in the scheduling manner, time synchronization information of the second device, slot alignment information of the second device, and interference measurement information of the second device.

For example, same as the first device, the second device may also send information such as the information used to indicate that the second device supports and/or is working in the second frequency band in the scheduling manner, the time synchronization information of the second device, the slot alignment information of the second device, and the interference measurement information of the second device, so that a neighboring device of the second device receives the corresponding information, thereby performing proper scheduling.

In one implementation, the second device is a neighboring device of the first device.

In one embodiment, the fifth indication information is sent by using a primary channel of the second device and/or a primary channel of the neighboring device of the second device.

In one implementation, before that the first device sends scheduling information to the second device in a first frequency band, the method further includes:
  The second device sends request information to the first device, and correspondingly, the first device receives the request information from the second device, where the request information is used to request to perform data transmission in the second frequency band; and
    that the first device sends scheduling information to the second device in a first frequency band includes:
  The first device sends the scheduling information to the second device in the first frequency band based on the request information.

For example, the first device may schedule, based on a request of the second device, the second device to communicate in the second frequency band. In this way, an effect of active reservation is achieved.

In one embodiment, the request information includes at least one of the following information: a service type requested by the second device and/or a quantity of resources required by the second device in the second frequency band.

For example, the request information may further carry the service type requested by the second device and a quantity of resources that are required by the second device to be reserved for communication in the second frequency band, for example, a bandwidth, a time, and a quantity of slots. However, this is not limited in this embodiment.

In one embodiment, the request information is carried in an add traffic stream request frame.

For example, the request information may be carried in the add traffic stream request frame (ADDTS Request frame), or may be carried in another frame. Further, the first device may feedback a response message to the second device, for example, use at least one bit in any reserved bit to indicate whether the first device allows the second device to perform communication in the second frequency band.

For ease of understanding, the following describes this application in detail by using an example in which the first frequency band is 2.4/5 GHz, the second frequency band is 6 GHz, the first device is an AP, and the second device is a STA.

The foregoing "working in the second frequency band in a scheduling manner" may also be referred to as "using a scheduling protocol at 6 GHz" or "joining a network that uses a scheduling protocol at 6 GHz" in this embodiment. A scheduling protocol in this scenario is also referred to as a "6 GHz scheduling protocol". However, it should be understood that this is merely an example name for ease of understanding. This is not limited in this application.

Step 1: Initialize Scheduling

When the AP wants to use the scheduling protocol at 6 GHz or wants to join the network that uses the scheduling protocol at 6 GHz, the first device may listen to a channel for a period of time to receive beacons (or other frames that carry related information and that may be sent after the beacons) of the neighboring devices (for example, neighboring APs). The beacon may carry at least one of the following information:
  (1) a periodicity of the beacon;
  (2) whether the neighboring device supports using the scheduling protocol at 6 GHz, and/or whether the neighboring device is using the scheduling protocol at 6 GHz;
  (3) time synchronization information, slot alignment information, and the like;
  (4) slot scheduling information at 6 GHz; and
  (5) information such as interference measurement information.

The first device may determine, based on the foregoing information, which neighboring devices currently support or are using the scheduling protocol at 6 GHz, and a resource allocation used by the neighboring devices, to determine a subsequent scheduling solution.

The period of time may be a time specified in any standard, for example, maximum permitted beacon interval duration, to ensure that the AP can listen to the beacon. For example, the first device may listen to different channels, because each of the plurality of neighboring devices may have a different primary channel. It should be understood that one device has one primary channel. Therefore, for a plurality of devices, primary channels of all the devices may be the same or may be different. This is not limited in this embodiment.

Similarly, after the AP joins the network that uses the scheduling protocol at 6 GHz, the beacon (or another frame that may be sent after the beacon) may carry at least one of the foregoing information (1) to (5), and then the beacon may be sent on a primary channel of the AP, or may be sent on the primary channel of the neighboring device.

Step 2: Perform the Scheduling

The AP may send scheduling information to a STA at 2.4/5 GHz, to schedule the AP to perform data transmission with the STA at 6 GHz. A source of the scheduling information may be classified into the following two cases:
  1. A central node such as an access controller (AC) distributes the scheduling information to each AP. It should be understood that the AC is a central control node, and is a device configured to manage a plurality of APs. For example, there are a plurality of APs in an enterprise, and one AC manages all the APs in the enterprise. This case usually occurs in a centralized network, for example, an enterprise network. Therefore, there is a central node for centralized control.

2. Each AP makes a scheduling decision separately to determine the scheduling information. This case usually occurs in a distributed network. The scheduling decision may be based on at least one of the following information:

(1) Uplink and downlink service information in this BSS. For example, a quantity of uplink and downlink services that each STA has and a service type of the STA. For example, the AP may allocate and schedule more resources to a STA with a large service volume and a high service type priority.

(2) Interference information of this BSS and/or interference information between OBSSs.

For example, in this BSS, when the AP 1 is scheduled to communicate with the STA 1, the STA 2 may be scheduled to communicate with the STA 3 at the same time, provided that interference caused by the communication between the STA 2 and the STA 3 to the communication between the AP 1 and the STA 1 is relatively small. The interference value may be set to be less than the OBSS PD level. It should be understood that, the OBSS PD level is a value different from this BSS PD level. For example, if the AP determines, after receiving a data packet, that the data packet is from an OBSS, the AP uses the OBSS PD level for comparison.

Similarly, scheduling resources between the OBSSs can overlap. To be specific, the AP 1 may be scheduled to communicate with the STA 1 on a resource, and the AP 2 may be scheduled to communicate with the STA 2 on the same resource at the same time, provided that interference caused by the STA 2 to communication is relatively small, for example, less than the OBSS PD level.

(3) A quantity, for example, N, of neighboring devices (neighboring Aps) that are in the neighboring devices and that support and/or are using the scheduling protocol at 6 GHz, where N is a positive integer.

(4) Resources used between the OBSSs cannot overlap. To be specific, a resource allocated by the AP to this BSS cannot exceed a threshold, for example, cannot exceed 1/(N+1) or 1/N of the total resource.

In one implementation, resource allocation needs to comply with at least one of the following rules:

A bandwidth of this BSS of the first device does not exceed 1/(N+1) of a total bandwidth;

a time of this BSS of the first device does not exceed 1/(N+1) of a time, for example, does not exceed 1/(N+1) of a time in a beacon interval (Beacon interval); and a quantity of slots included in this BSS of the first device does not exceed 1/(N+1) of a total quantity of slots, and the total quantity of slots may be equal to a quantity of slots in each channel in one beacon interval multiplied by a quantity of channels.

The first device may determine the scheduling information based on the foregoing resource allocation rule with reference to a resource usage status, obtained through listening, of another device in the beacon.

For example, FIG. 3 to FIG. 9 are schematic diagrams of frame structures of scheduling information according to the embodiments of this application. The scheduling information in the embodiments of this application may include the following frame structures.

1. A general structure, as shown in FIG. 3, For example including the following fields:

1) Slot structure start time (Slot Structure Start Time): a time point when a slot starts, where the slot structure start time may be a 4-byte absolute time, and the time can be used as a reference time point for this BSS and the OBSS.

2) Per slot duration (Per Slot duration): duration of a slot.

It should be understood that, in one implementation, duration of a slot is fixed (for example, 1 ms) according to specifications in the standard. In this case, this field may be not required. In another possible implementation, the slot duration is selected from a plurality of pieces of predefined candidate duration. In this case, the field is required to indicate the selected duration. In another possible implementation, the slot duration is calculated based on another parameter, for example, based on the foregoing parameter N (the quantity of neighboring devices that support and/or are using the scheduling protocol at 6 GHz). A larger quantity N indicates shorter slot duration. For example, per slot duration=total duration/N, per slot duration=total duration/2N, or per slot duration=total duration/xN, where x may be indicated in another element. For another example, a larger quantity N indicates longer slot duration. This is not limited in this embodiment.

Inter-slot space (Inter-slot space): space between the slots, where in the standard, it may be stipulated that duration of the inter slot space is fixed, for example, equal to duration of any x interframe space (XIFS), for example, short interframe space (SIFS), distributed interframe space (DIFS), poll interframe space (PIFS), or a random interframe space (RIFS). If it is specified in the standard that the inter slot space is not required, the field may be not required in the scheduling information.

Quantity of slots (The quantity of slots): a quantity, represented by M, of slots.

Slot structure end time (Slot Structure End Time): a time point when a slot ends, where the slot structure end time may be a 4-byte absolute time.

Time unit: a time unit indicated by using the scheduling information, where for example, 0 corresponds to 1 ns, 1 corresponds to 10 ns, 2 corresponds to 100 ns, 3 corresponds to 1 μs, 4 corresponds to 10 μs, 5 corresponds to 100 μs, and 6 corresponds to 1 ms; there may be many other examples; this is not limited herein.

Allocation type (unicast/multicast/broadcast allocation for each slot): indicating an allocation type for each slot, where as shown in Table 1:

TABLE 1

| Binary code | Role of a STA |
| --- | --- |
| 00 | Unicast (Unicast) |
| 01 | Multicast (Multicast) or groupcast (Groupcast) |
| 10 | Broadcast (Broadcast) |
| 11 | Reserved (Reserved) |

Alternatively, the AP may use only one bit to indicate the type. For example, 0 indicates unicast, and 1 indicates non-unicast, namely, groupcast, multicast, or broadcast (Groupcast/multicast/broadcast).

2. Scheduling Information for Each STA.

Figure 4:
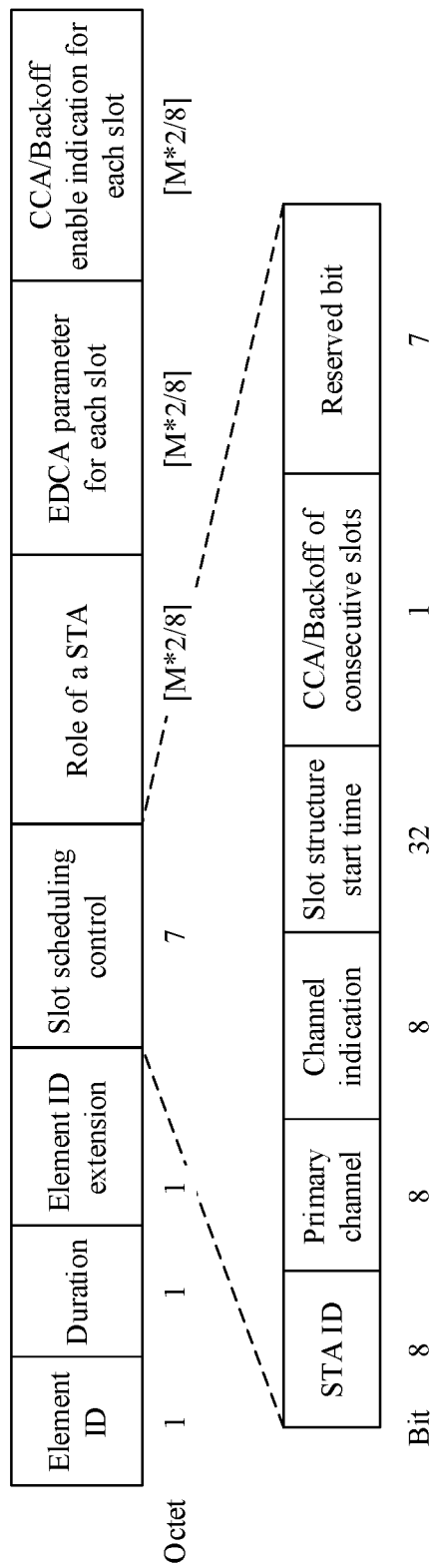
FIG. 4 is another schematic structural diagram of scheduling information according to an embodiment of this application.

(1) If the AP separately sends the scheduling information to each STA, a structure shown in FIG. 4 may be used.

STA ID: If the scheduling information is unicast, the field is not required; if the scheduling information is non-unicast (for example, broadcast), the STA ID is required, where the STA ID may be a MAC address, or may be an AID or the like.

Primary channel: indicating a primary channel for scheduling communication, where the primary channel may be different from an original primary channel.

Channel indication: indicating a working channel, where a specific channel allocation status may be indicated by using a bitmap or a special encoding scheme.

Slot structure start time (Slot Structure Start Time): a time point when a slot starts, where the slot schedule start time may be a 4-byte absolute time.

CCA/Backoff of consecutive slots: If slots are consecutively allocated to a same STA, it may be indicated that CCA/backoff is repeatedly performed in each slot, or CCA/backoff is performed only in the first slot.

Role of the STA (Bitmap and Role Schedule): indicating a role of a scheduled STA in each slot, where the scheduling information corresponds to M slots, the role of the STA in each slot is indicated by using x bits, for example, x=2 herein, and a specific correspondence may be shown in the following table:

TABLE 2

| Binary code | Role of a STA |
| --- | --- |
| 00 | Not allocated slot (Not allocated slot), padding slot (padding slot), or groupcast/broadcast slot (groupcast/broadcast slot) |
| 01 | Initiator (Initiator) |
| 10 | Responder (Responder) |
| 11 | Listener (Listener) |

In this application, the AP may serve as the initiator, and the STA may serve as the listener. Alternatively, the AP may serve as the responder, and the STA serves as the listener. This is not limited herein.

A not allocated slot (Not allocated slot) indicates that the slot is not allocated to the scheduled STA.

A padding slot indicates that the slot originally does not exist. However, because of rounding up in a formula ⌈M*2/8⌉, some additional slots may be generated.

An initiator, a responder, or a listener indicates that the role of the scheduled STA is an initiator, a responder, or a listener respectively.

In a slot, the AP may always perform transmission first, and the STA always waits for receiving from the beginning. In a case of device-to-device communication, the initiator performs transmission first, or an initiator indicated by a network performs transmission first. If the scheduled STA is a listener, the STA may perform measurement in a corresponding slot.

EDCA parameter for each slot: an EDCA parameter for each slot, where the EDCA parameter for each slot may include one or any combination of a plurality of EDCA parameter set elements in an existing standard.

CCA/Backoff enable indication for each slot: indicating whether CCA/backoff is performed in each slot, where the indication may be separately performed in each slot, for example, assuming that each slot requires one bit, ⌈M*2/8⌉ bytes are required; or assuming that each slot requires two bits, ⌈M*2/8⌉ bytes are required, the indication may alternatively be used as an overall indication (in this case, one bit or two bits are required), for example, when one bit is required, 0 indicates that the CCA and the backoff are not required, and 1 indicates that the CCA and the backoff are required, for another example, when two bits are required, 00 indicates that the CCA and the backoff are not required, 01 indicates that the CCA is not required and the backoff is required, 10 indicates that the CCA is required and the backoff is not required, and 11 indicates that the CCA and the backoff are required.

Figure 5:
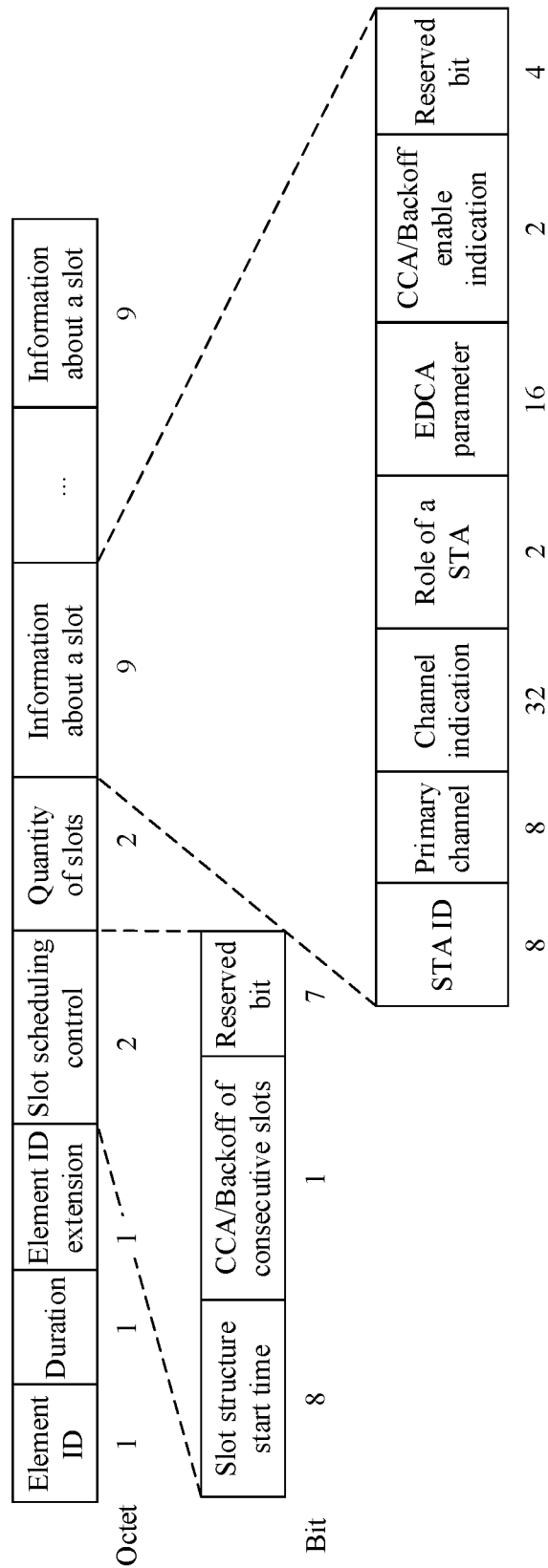
FIG. 5 is another schematic structural diagram of scheduling information according to an embodiment of this application.

(2) If the AP broadcast the scheduling information to all STAs, a structure shown in FIG. 5 may be used.

Note: In per slot info, each slot may be allocated to a plurality of different STAs. In addition, the STA ID may be an association identifier (association identifier, AID), a group ID, or a broadcast ID of a STA (for example, the STA ID is indicated by using only 0 or 1). For example, after a STA is associated with an AP, the AP allocates a short number to the STA. An original MAC address is 48 bits, and an AID is eight bits (for a high-frequency standard such as 11ad/ay), or the AID is 11 bits or 14 bits (for a low-frequency standard such as 11n/ac/ax). In the foregoing structure, if one slot is required to be allocated to a plurality of STAs, the allocation needs to be repeated for a plurality of times.

Figure 6:
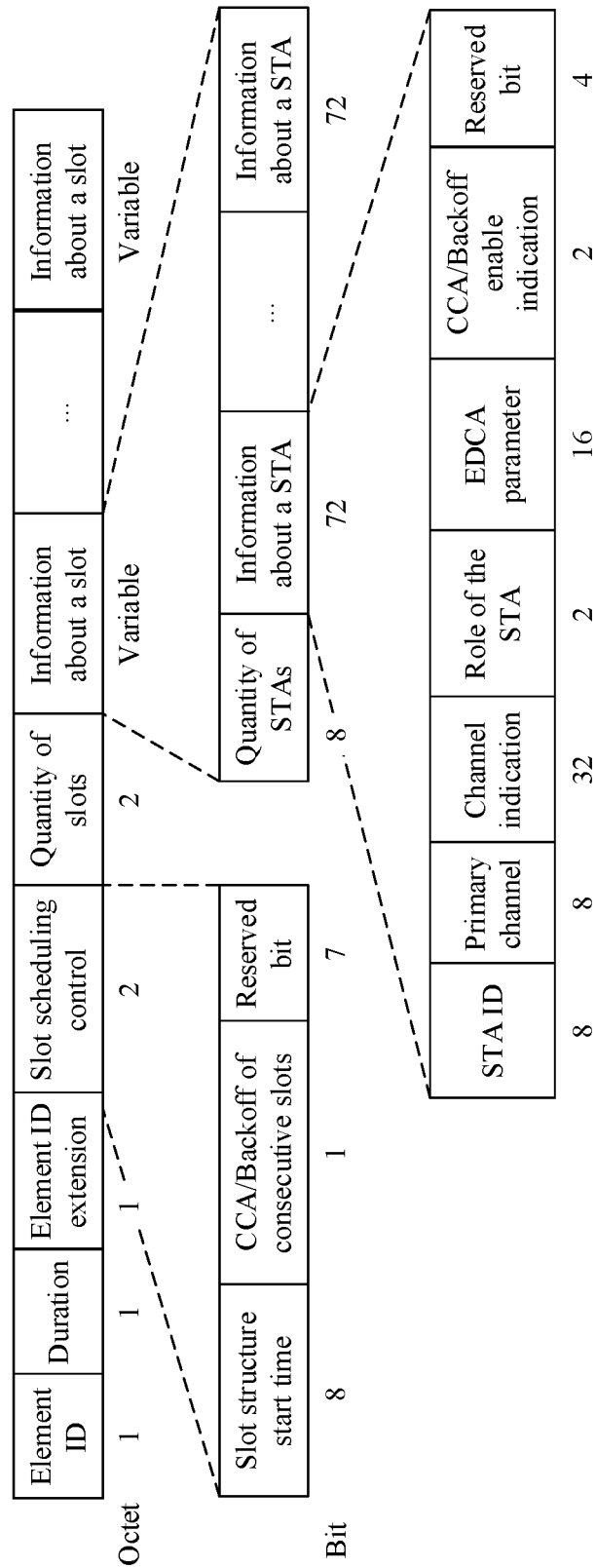
FIG. 6 is another schematic structural diagram of scheduling information according to an embodiment of this application.

If the AP broadcast the scheduling information to a part of or all STAs, a structure shown in FIG. 6 may also be used.

Figure 7:
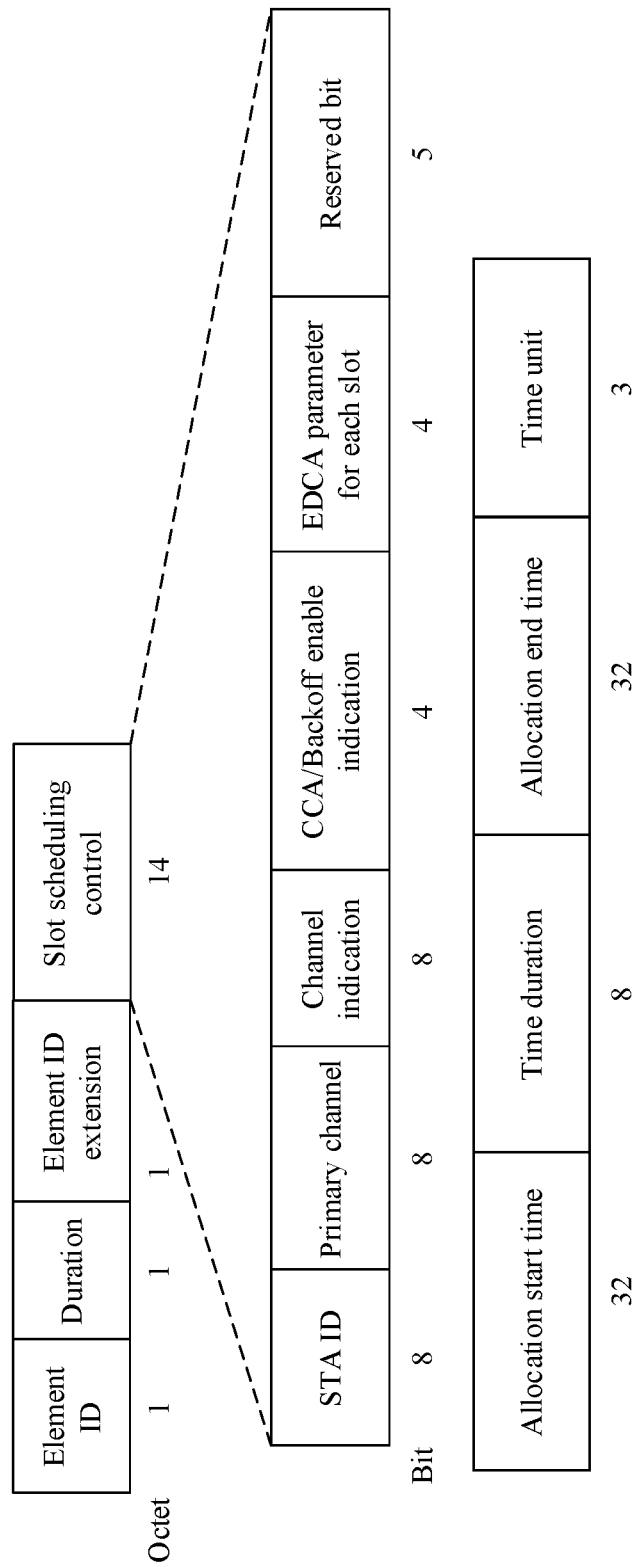
FIG. 7 is another schematic structural diagram of scheduling information according to an embodiment of this application.
Figure 8:
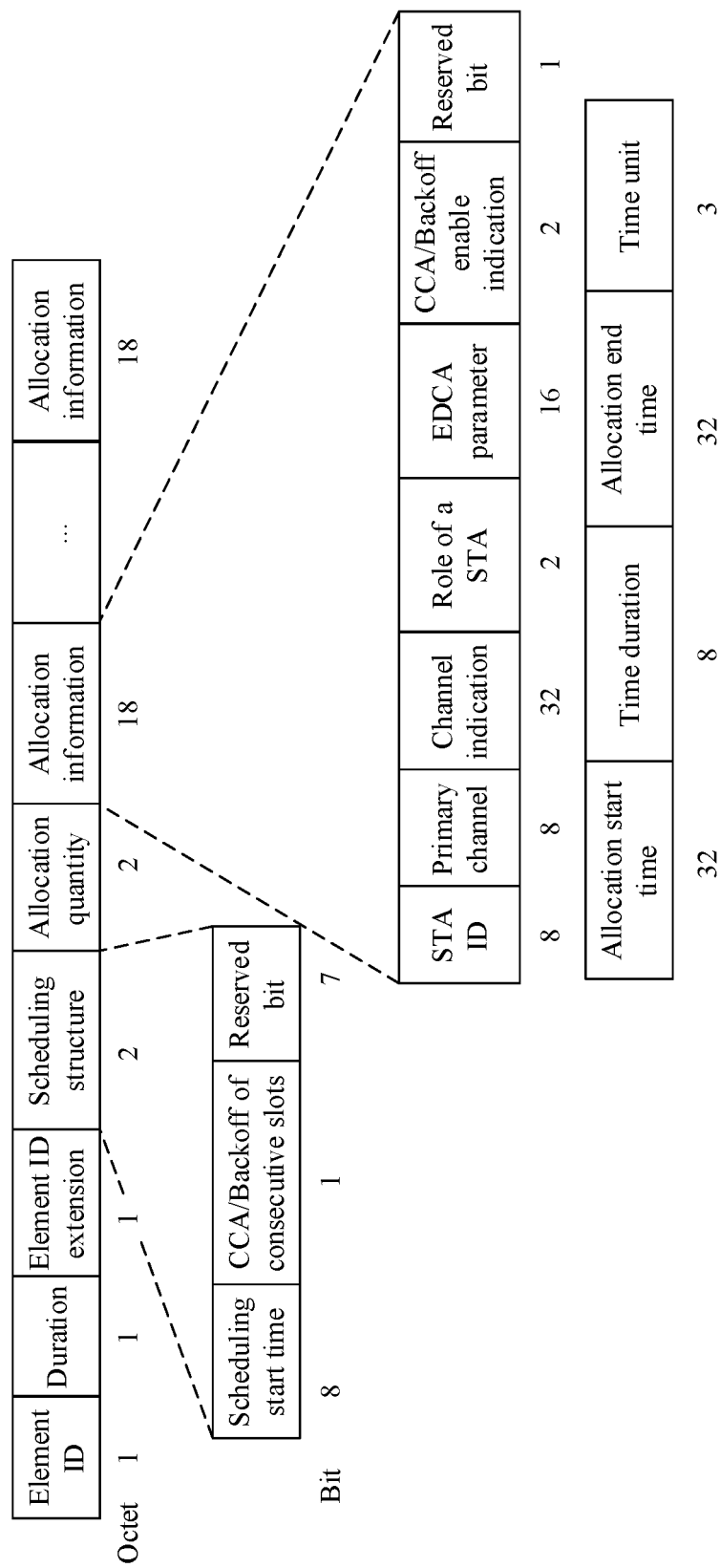
FIG. 8 is another schematic structural diagram of scheduling information according to an embodiment of this application.
Figure 9:
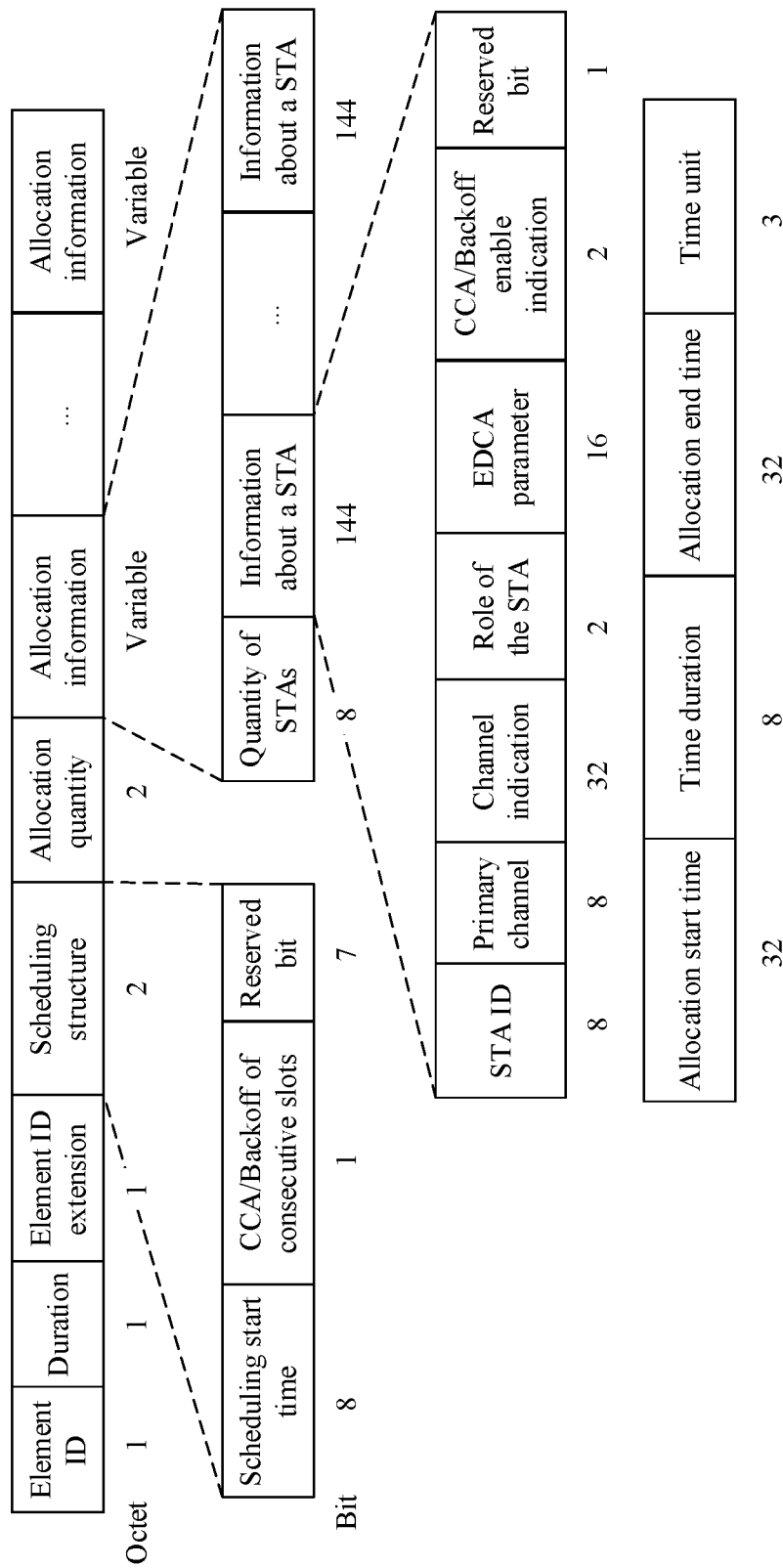
FIG. 9 is another schematic structural diagram of scheduling information according to an embodiment of this application.

It should be understood that the scheduling information in various embodiments in accordance with the present disclosure may alternatively be not divided based on slots, but directly uses a form of a time period. That is, a period of time is directly scheduled. Specific frame structures are shown in FIG. 7, FIG. 8, and FIG. 9. Because principles are similar, details are not described herein again.

Figure 10:
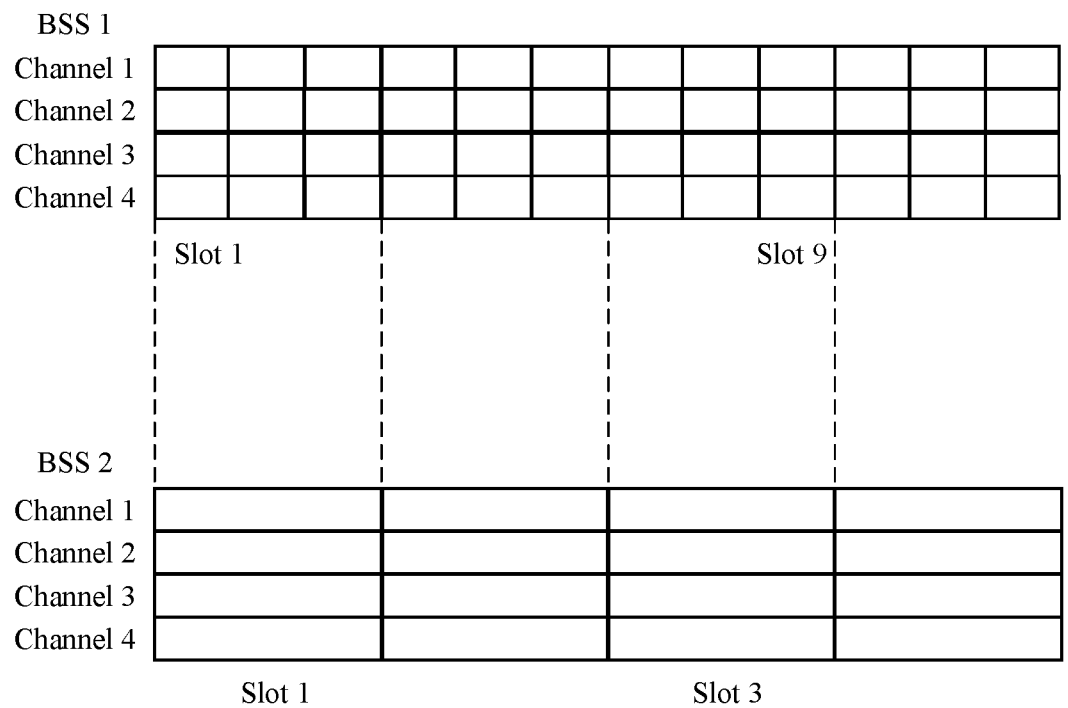
FIG. 10 is a schematic diagram of a slot structure of scheduling information according to an embodiment of this application.

Slot-based scheduling can ensure that the frame structure is regular and controllable, and improve transmission efficiency. For example, a slot of the scheduling information may be completely aligned with a slot of information about another BSS. Alternatively, when duration of the two slots is different, the duration of the two slots may be an integer multiple of each other, as shown in FIG. 10. This is not limited in the embodiments of this application.

For example, the AP may temporarily change duration of a slot (namely, the foregoing Per Slot duration). To maintain an effect achieved in FIG. 10, the AP needs to comply with at least one of the following rules:

(a) increasing to Q times of original duration, where Q is an integer;

(b) decreasing to 1/P of the original duration, where P is an integer; and (c) no matter increasing or decreasing, in N+1 BSSs (all BSSs that can share a resource), a value after the change needs to be an integer multiple of values smaller than the value after the change, and values greater than the value after the change can be exactly divided by the value after the change, for example, for six BSSs, per slot duration of a BSS 1 to a BSS 5 is 1 ms, 2 ms, 4 ms, 8 ms, and 16 ms respectively, if original slot duration of a BSS 6 is 1 ms, the slot duration of the BSS 6 may be changed to 0.1 ms, 0.2 ms, 0.5 ms, 2 ms, 4 ms, 8 ms, 16 ms, or the like, and this is not limited herein.

In this embodiment, slot alignment between OBSSs is ensured as much as possible, unless a slot in a BSS is completely located in a slot in another BSS. For example, in FIG. 10, a slot 2 in a BSS 1 is completely located in a slot 1 in a BSS 2.

In this embodiment, the scheduling information may alternatively reuse a structure of a restricted access window parameter set (RPS) element. A restricted access window is referred to as RAW for short. For example, in an RPS, one bit is used to indicate that the RPS element is used to indicate the scheduling information. It should be understood that the foregoing RAW is a function defined in 802.11ah. For example, resources are divided into a plurality of slots, and only a part of devices are allowed to perform communication in corresponding slots.

For example, the RPS may include fields such as unicast/multicast/broadcast allocation for each slot, Primary channel, CCA/backoff between consecutive slots enable, Bitmap and Role Schedule, EDCA parameter for each slot and CCA/Backoff enable indication for each slot in the foregoing scheduling information. The fields may be correspondingly placed in a reserved bit in the RPS, or the RPS may be extended, or the foregoing information is carried in a new information element. This is not limited in this embodiment.

Step 3: Perform Communication Based on the Scheduling

After the AP successfully schedules the STA, the AP and the STA may perform data transmission at 6 GHz. A specific transmission process may comply with at least one of the following rules:

1. Duration of a slot may be fixed, for example, 1 ms. Alternatively, duration of a slot may be variable, that is, may be indicated by the first device by using the foregoing frame structure. This is not limited in this embodiment.
2. The AP always performs transmission first, and the STA always waits for receiving from the beginning. If the communication is device-to-device communication, for example, communication between APs or communication between STAs, an initiator (Initiator) performs transmission first.
3. Transmission is performed based on the scheduling information.

When only two devices are scheduled in a slot, single user (SU) transmission may be performed; when more than two devices are scheduled in a slot, SU transmission and multi-user (MU) transmission may be performed.

4. The STA performs measurement (the STA performs measurement if the STA is scheduled, or the STA performs measurement spontaneously).

A completely unscheduled STA may perform measurement spontaneously or be in a sleep state.

In this embodiment, OBSSs can directly share some information and/or communicate with each other. The shared information may For example include: time synchronization information, slot alignment information, scheduling information of a slot at 6 GHz, interference measurement information, and the like. This is not limited in this embodiment. For example, the following manners may be used:

1. sending the information on a primary channel and/or on a primary channel of a neighboring device via a beacon, to ensure that the neighboring device can obtain the information through listening;
2. sending the information by using a special frame based on a multi-AP architecture to a neighboring device on a primary channel and/or on a primary channel of the neighboring device; and
3. reporting information that is about the OBSS and that is obtained by a STA in this BSS through listening to an AP in this BSS.

In this embodiment, some rules that are favorable for cooperation may be further added, to make the AP tend to participate in such cooperation. The rules may For example include at least one of the following manners:

1. The OBSS PD level is changed. For example, the OBSS PD level is increased.
2. After the OBSS PD level is increased, a corresponding transmit power does not require backoff That is, the corresponding transmit power is reduced (a transmit power of a BSS that does not participate in the cooperation requires the backoff). For example, for the BSS that does not participate in the cooperation, if the OBSS PD level is increased from −82 dBm to −72 dBm, the transmit power is reduced by 10 dB accordingly. For a BSS that participates in the cooperation, the transmit power does not need to be changed.
3. After the OBSS PD level is increased, a constant is subtracted from a corresponding transmit power backoff value. Alternatively, the transmit power of the BBS that participates in the cooperation performs the backoff only after the OBSS PD level is increased to a threshold (the transmit power of the BSS that does not participate in the cooperation always requires the backoff). For example, the constant is 3. If the OBSS PD level is increased from −82 dBm to −72 dBm, the corresponding transmit power backoff value is 10 dB. In this case, the transmit power should be decreased by 7 dB (10 minus 3). Alternatively, the foregoing threshold is −77 dBm. If the OBSS PD level is increased from −82 dBm to −77 dBm or less, the transmit power of the BBS that participates in the cooperation does not need to be reduced.
4. The backoff may not be used, or the CCA and the backoff may not be used, or a minimum backoff value is used, or a backoff value is always set to 1, or a CCA time is shortened. In this way, EDCA parameter configuration is more advantageous.
5. A transmission opportunity (transmission opportunity, TXOP) limit is changed. For example, an upper limit of a TXOP is increased, so that a channel is occupied for a longer time, and a data transmission time is longer.
6. A resource may be shared. For example, a remaining resource not to be used by an AP can be shared with another AP.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail examples of the data transmission method provided in this application. It may be understood that, to implement the foregoing functions, the first device and the second device include corresponding hardware structures and/or software modules for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application. The following describes data transmission apparatuses according to the embodiments of this application with reference to FIG. 11 to FIG. 14.

Figure 11:
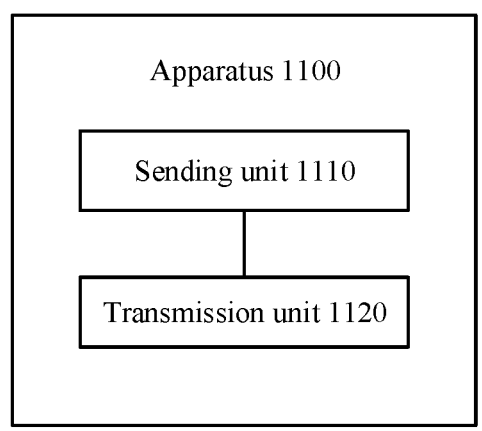
FIG. 11 is an example block diagram of a data transmission apparatus according to an embodiment of this application.

FIG. 11 is an example block diagram of a data transmission apparatus according to an embodiment of this application, and the apparatus 1100 may include a sending unit 1110 and a transmission unit 1120.

The sending unit 1110 is configured to send scheduling information to a second device in a first frequency band, where the scheduling information is used to schedule the second device to perform data transmission in a second frequency band, the scheduling information carries first indication information, and the first indication information is used to indicate a resource used by the apparatus and the second device to perform data transmission; and the transmission unit 1120 is configured to perform, based on the scheduling information, data transmission with the second device in the second frequency band by using the resource.

For the data transmission apparatus in this embodiments of this application, the first device schedules, in the first frequency band, the second device to perform data transmission in the second frequency band, so that a device can be scheduled based on a plurality of frequency bands to perform data transmission. In this way, a larger bandwidth is used, a throughput rate is increased, and system performance is improved.

In some embodiments, the apparatus further includes a determining unit, configured to determine the scheduling information based on at least one of the following information before that the scheduling information is sent to the second device in the first frequency band: uplink and downlink service information in a first basic service set to which the apparatus belongs; a quantity of neighboring devices that are in neighboring devices of the apparatus and that support and/or are working in the second frequency band in a scheduling manner; interference information in the first basic service set; interference information between the first basic service set and a second basic service set; and a resource allocation rule between the first basic service set and the second basic service set, where the second basic service set includes a basic service set that performs resource sharing with the first basic service set.

In some embodiments, the resource allocation rule is that a resource used by the first basic service set does not exceed 1/(N+1) of a resource used for sharing, and N is a quantity of basic service sets that perform resource sharing with the first basic service set.

In some embodiments, the resource allocation rule includes any one of the following rules: a bandwidth corresponding to the first basic service set does not exceed 1/(N+1) of a bandwidth used for sharing; a time corresponding to the first basic service set does not exceed 1/(N+1) of a time used for sharing; and a quantity of slots corresponding to the first basic service set does not exceed 1/(N+1) of a quantity of slots used for sharing.

In some embodiments, the apparatus further includes a first receiving unit, configured to receive second indication information from the neighboring device, where the second indication information includes at least one of the following information: information used to indicate that the neighboring device supports and/or is working in the second frequency band in the scheduling manner, time synchronization information of the neighboring device, slot alignment information of the neighboring device, and interference measurement information of the neighboring device.

In some embodiments, the sending unit is further configured to send third indication information, where the third indication information includes at least one of the following information: information used to indicate that the apparatus supports and/or is working in the second frequency band in the scheduling manner, time synchronization information of the apparatus, slot alignment information of the apparatus, and interference measurement information of the apparatus.

In some embodiments, the third indication information is sent by using a primary channel of the apparatus and/or a primary channel of the neighboring device of the apparatus.

In some embodiments, the apparatus further includes a second receiving unit, configured to receive request information from the second device before the scheduling information is sent to the second device in the first frequency band, where the request information is used to request to perform data transmission in the second frequency band; and the sending unit is For example configured to send the scheduling information to the second device in the first frequency band based on the request information.

In some embodiments, the request information includes at least one of the following information: a service type requested by the second device and/or a quantity of resources required by the second device in the second frequency band.

It should be understood that, the apparatus 1100 herein is presented in a form of function units. The term "unit" herein may refer to an application specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In one example, a person skilled in the art may understand that the apparatus 1100 provided in this application corresponds to the process performed by the first device in the foregoing method embodiment. For a function of each unit/module in the apparatus, refer to the foregoing descriptions. Details are not described herein again.

Figure 12:
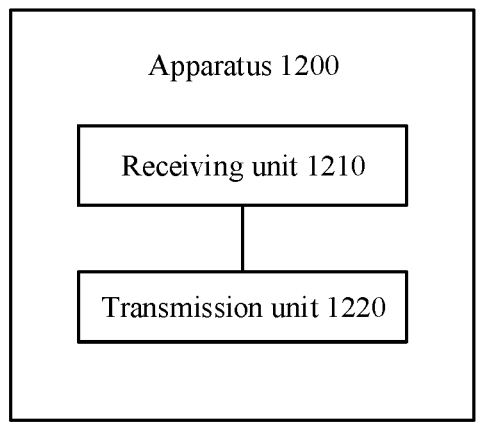
FIG. 12 is an example block diagram of another data transmission apparatus according to an embodiment of this application.

FIG. 12 is a schematic structural diagram of another data transmission apparatus according to an embodiment of this application, and the apparatus 1200 may include a receiving unit 1210 and a transmission unit 1220.

The receiving unit 1210 is configured to receive scheduling information from a first device in a first frequency band, where the scheduling information is used to schedule the apparatus to perform data transmission in a second frequency band, the scheduling information carries first indication information, and the first indication information is used to indicate a resource used by the first device and the apparatus to perform data transmission; and the transmission unit 1220 is configured to perform, based on the scheduling information, data transmission with the first device in the second frequency band by using the resource.

For the data transmission apparatus in this embodiments of this application, the first device schedules, in the first frequency band, the second device to perform data transmission in the second frequency band, so that a device can be scheduled based on a plurality of frequency bands to perform data transmission. In this way, a larger bandwidth is used, a throughput rate is increased, and system performance is improved.

In some embodiments, the apparatus further includes: a first sending unit, configured to send fifth indication information for the apparatus, where the fifth indication information includes at least one of the following information: information used to indicate that the apparatus supports and/or is working in the second frequency band in a scheduling manner, time synchronization information of the apparatus, slot alignment information of the apparatus, and interference measurement information of the apparatus.

In some embodiments, the fifth indication information is sent by using a primary channel of the apparatus and/or a primary channel of a neighboring device of the apparatus.

In some embodiments, the apparatus further includes a second sending unit, configured to send request information to the first device before the scheduling information from the first device is received in the first frequency band, where the request information is used to request to perform data transmission in the second frequency band.

In some embodiments, the request information includes at least one of the following information: a service type requested by the apparatus and a quantity of resources required by the apparatus in the second frequency band.

It should be understood that, the apparatus 1200 herein is presented in a form of function units. The term "unit" herein may refer to an application specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In one example, a person skilled in the art may understand that the apparatus 1200 provided in this application corresponds to the process performed by the second device in the foregoing method embodiment. For a function of each unit/module in the apparatus, refer to the foregoing descriptions. Details are not described herein again.

The apparatus 1100 and the apparatus 1200 in the foregoing solutions have functions of implementing corresponding steps performed by the first device and the second device in the foregoing methods. The function may be implemented by hardware, or may be implemented by hardware by executing corresponding software. The hardware or the software includes one or more modules corresponding to the foregoing functions. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In the embodiments of this application, the apparatuses in FIG. 11 and FIG. 12 may alternatively be a chip or a chip system, for example, a system on chip (system on chip, SoC). Correspondingly, the receiving unit and the sending unit may be a transceiver circuit of the chip. This is not limited herein.

Figure 13:
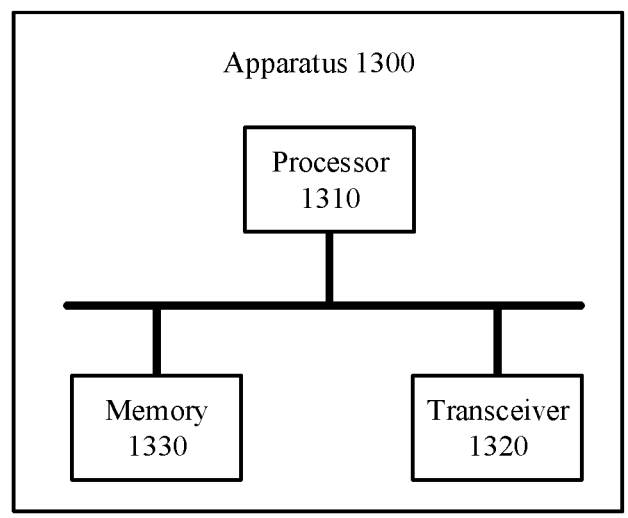
FIG. 13 is an example block diagram of another data transmission apparatus according to an embodiment of this application.

FIG. 13 shows another data transmission apparatus 1300 according to an embodiment. The apparatus 1300 includes a processor 1310 and a transceiver 1320. In some embodiments, the apparatus 1300 may further include a memory 1330. The processor 1310, the transceiver 1320, and the memory 1330 communicate with each other by using an internal connection path. The memory 1330 is configured to store an instruction. The processor 1310 is configured to execute the instruction stored in the memory 1330, to control the transceiver 1320 to send a signal and/or receive a signal.

When the instruction stored in the memory 1330 is executed by the processor 1310, the processor 1310 is configured to: send scheduling information to a second device in a first frequency band by using the transceiver 1320, where the scheduling information is used to schedule the second device to perform data transmission in a second frequency band, the scheduling information carries first indication information, and the first indication information is used to indicate a resource used by the apparatus and the second device to perform data transmission; and perform, based on the scheduling information, data transmission with the second device in the second frequency band by using the resource.

It should be understood that the apparatus 1300 may be, for example, the first device in the foregoing embodiments, and may be configured to perform each step and/or procedure corresponding to the first device in the foregoing method embodiments. In some embodiments, the memory 1330 may include a read-only memory and a random access memory, and provide an instruction and data to the processor. A part of the memory may further include a non-volatile random access memory. For example, the memory may further store information of a device type. The processor 1310 may be configured to execute the instruction stored in the memory, and when the processor 1310 executes the instruction stored in the memory, the processor 1310 is configured to perform each step and/or procedure in the method embodiments corresponding to the first device.

Figure 14:
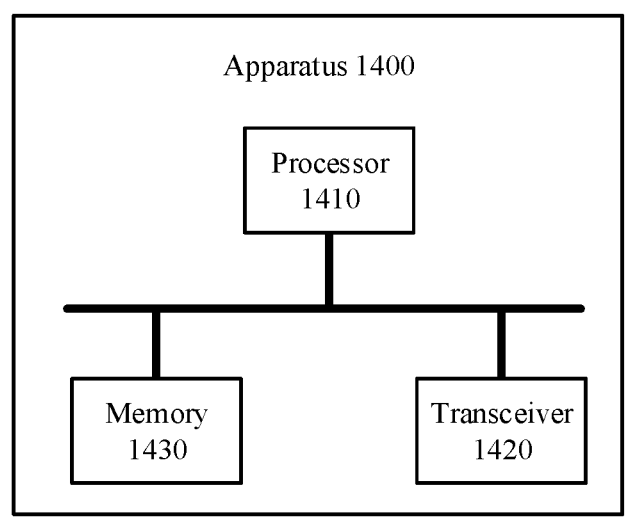
FIG. 14 is an example block diagram of another data transmission apparatus according to an embodiment of this application.

FIG. 14 shows another data transmission apparatus 1400 according to an embodiment. As shown in FIG. 14, the apparatus 1400 includes a processor 1401 and a transceiver 1402. In some embodiments, the apparatus 1400 further includes a memory 1403. The processor 1401, the transceiver 1402, and the memory 1403 communicate with each other by using an internal connection path, to transfer a control signal and/or a data signal. The memory 1403 is configured to store a computer program. The processor 1401 is configured to invoke the computer program from the memory 1403 and run the computer program, to control the transceiver 1402 to send and receive a signal.

When the instruction stored in the memory 1403 is executed by the processor 1401, the processor 1401 is configured to: receive scheduling information from a first device in a first frequency band by using the transceiver 1402, where the scheduling information is used to schedule the apparatus to perform data transmission in a second frequency band, the scheduling information carries first indication information, and the first indication information is used to indicate a resource used by the first device and the apparatus to perform data transmission; and perform, based on the scheduling information, data transmission with the first device in the second frequency band by using the resource.

It should be understood that the apparatus 1400 may be, for example, the second device in the foregoing embodiments, and may be configured to perform each step and/or procedure corresponding to the second device in the foregoing method embodiments. In some embodiments, the memory 1430 may include a read-only memory and a random access memory, and provide an instruction and data to the processor. A part of the memory may further include a non-volatile random access memory. For example, the memory may further store information of a device type. The processor 1410 may be configured to execute the instruction stored in the memory, and when the processor 1410 executes the instruction stored in the memory, the processor 1410 is configured to perform each step and/or procedure in the method embodiments corresponding to the second device.

An embodiment of this application further provides a processing apparatus, including a processor and an interface. The processor is configured to perform the data transmission method according to any one of the foregoing method embodiments.

It should be understood that, the processing apparatus may be a chip. For example, the processing apparatus may be a field-programmable gate array (FPGA), an application specific integrated chip (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in the embodiments of the present invention may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

An embodiment this application further provides a communications system. The communications system includes the foregoing first device and second device.

An embodiment of this application further provides a computer-readable medium. The computer-readable medium stores a computer program, and when the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, although the foregoing describes a communication method in downlink transmission in a communications system, this application is not limited to this. In some embodiments, a solution similar to that in the foregoing description may also be used in uplink transmission. To avoid repetition, details are not described again herein.

The network device and the terminal device in the foregoing apparatus embodiments entirely correspond to the network device or the terminal device in the method embodiments. A corresponding module or unit performs a corresponding step. For example, a sending module (transmitter) performs a sending step in the method embodiments, a receiving module (receiver) performs a receiving step in the method embodiments, and a step other than sending and receiving steps may be performed by a processing module (processor). For a function of a specific module, refer to a corresponding method embodiment. The sending module and the receiving module may form a transceiver module, and the transmitter and the receiver may form a transceiver, to jointly implement receiving and sending functions. There may be one or more processors.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that "an embodiment" mentioned in the whole specification does not mean that particular features, structures, or characteristics related to the embodiment are included in at least one embodiment of this application. Therefore, "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and according to, for example, a signal having one or more data packets (for example, data from two components interacting with another component in a local system, a distributed system, and/or across a network such as the Internet interacting with other systems by using the signal).

It should be further understood that, the first, second, third, fourth, and various numbers in this specification are merely distinguished for convenient description, and are not intended to limit the scope of the embodiments of this application.

The term "and/or" in this specification is only an association relationship for describing associated objects and represents that three relationships may exist. For example, A and/or B may represent the following three cases: Only A exists, both A and B exist, and only B exists.

A person of ordinary skill in the art may be aware that, illustrative logical blocks (illustrative logical block) and steps (step) described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions (programs). When the computer instructions (programs) are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission apparatus, comprising:
a transceiver configured to send scheduling information to a second device in a first frequency band, wherein
the scheduling information is configured for scheduling the second device to perform data transmission in a second frequency band,
the scheduling information carries first indication information indicating a resource used by the data transmission apparatus and the second device for performing the data transmission,
the data transmission apparatus is configured to send the scheduling information to the second device in a unicast manner, or send the scheduling information to a plurality of second devices, including the second device, in a broadcast manner, and
a format of the scheduling information is different based on whether the scheduling information is sent in the unicast manner or the broadcast manner; and
a processor operatively coupled to the transceiver, wherein the processor is configured to: based on the scheduling information, control the transceiver to perform the data transmission with the second device in the second frequency band by using the resource.

2. The data transmission apparatus according to claim 1, wherein the processor is further configured to determine the scheduling information, before the scheduling information is sent to the second device in the first frequency band, based on at least one of the following:
uplink and downlink service information in a first basic service set to which the data transmission apparatus belongs;
a quantity of neighboring devices of the data transmission apparatus that support and/or are working in the second frequency band in a scheduling manner;
interference information in the first basic service set;
interference information between the first basic service set and a second basic service set; and
a resource allocation rule between the first basic service set and the second basic service set, wherein
the second basic service set comprises a basic service set that performs resource sharing with the first basic service set.

3. The data transmission apparatus according to claim 2, wherein the resource allocation rule is that a resource used by the first basic service set does not exceed 1/(N+1)th of a resource used for sharing, N being a quantity of basic service sets that perform resource sharing with the first basic service set.

4. The data transmission apparatus according to claim 3, wherein the resource allocation rule comprises any one of:
a bandwidth corresponding to the first basic service set does not exceed 1/(N+1)th of a bandwidth used for sharing,
a time corresponding to the first basic service set does not exceed 1/(N+1)th of a time used for sharing, and
a quantity of slots corresponding to the first basic service set does not exceed 1/(N+1)th of a quantity of slots used for sharing.

5. The data transmission apparatus according to claim 1, wherein the transceiver is further configured to receive second indication information from a neighboring device, wherein the second indication information comprises at least one of:
information configured to indicate that the neighboring device supports and/or is working in the second frequency band in a scheduling manner, time synchronization information of the neighboring device, slot alignment information of the neighboring device, and interference measurement information of the neighboring device.

6. The data transmission apparatus according to claim 1, wherein the transceiver is further configured to:
send third indication information, wherein the third indication information comprises at least one of:
information configured to indicate that the data transmission apparatus supports and/or is working in the second frequency band in a scheduling manner, time synchronization information of the data transmission apparatus, slot alignment information of the data transmission apparatus, and interference measurement information of the data transmission apparatus.

7. The data transmission apparatus according to claim 6, wherein the third indication information is sent by using a primary channel of the data transmission apparatus and/or a primary channel of a neighboring device of the data transmission apparatus.

8. The data transmission apparatus according to claim 1, wherein the transceiver is further configured to:
receive request information from the second device before the scheduling information is sent to the second device in the first frequency band, wherein the request information is configured to request to perform data transmission in the second frequency band; and
send the scheduling information to the second device in the first frequency band based on the request information.

9. The data transmission apparatus according to claim 8, wherein the request information comprises at least one of:
a service type requested by the second device and/or a quantity of resources required by the second device in the second frequency band.

10. The data transmission apparatus according to claim 1, wherein a size of a field associated with the scheduling information is different based on whether the data transmission apparatus sends the scheduling information in the unicast manner or the broadcast manner.

11. A data transmission apparatus, comprising:
a transceiver configured to receive scheduling information from a first device in a first frequency band, wherein
the scheduling information is configured for scheduling the data transmission apparatus to perform data transmission in a second frequency band,
the scheduling information carries first indication information indicating a resource used by the first device and the data transmission apparatus for performing the data transmission,
the data transmission apparatus is configured to receive the scheduling information from the first device in a unicast manner, or receive the scheduling information from the first device in a broadcast manner, and a format of the scheduling information is different based on whether the scheduling information is sent in the unicast manner or the broadcast manner; and a processor operatively coupled to the transceiver, wherein the processor is configured to: based on the scheduling information, control the transceiver to perform the data transmission with the first device in the second frequency band by using the resource.

12. The data transmission apparatus according to claim 11, wherein the transceiver is further configured to send fifth indication information for the data transmission apparatus, wherein the fifth indication information comprises at least one of:

information configured to indicate that the data transmission apparatus supports and/or is working in the second frequency band in a scheduling manner, and supports time synchronization information of the data transmission apparatus, slot alignment information of the data transmission apparatus and interference measurement information of the data transmission apparatus.

13. The data transmission apparatus according to claim 12, wherein the fifth indication information is sent by using a primary channel of the data transmission apparatus and/or a primary channel of a neighboring device of the data transmission apparatus.

14. The data transmission apparatus according to claim 11, wherein the transceiver is further configured to send request information to the first device before the scheduling information from the first device is received in the first frequency band, wherein the request information is configured for requesting to perform the data transmission in the second frequency band.

15. The data transmission apparatus according to claim 14, wherein the request information comprises at least one of:

a service type requested by the data transmission apparatus and a quantity of resources required by the data transmission apparatus in the second frequency band.

16. A non-transitory computer readable storage medium configured to store a computer program, which, when executed by a computer of a first device, causes the computer to provide execution comprising:

sending, scheduling information to a second device in a first frequency band, wherein the scheduling information is configured for scheduling the second device to perform data transmission in a second frequency band, the scheduling information carries first indication information indicating a resource used by the first device and the second device for performing the data transmission, the first device is configured to send the scheduling information to the second device in a unicast manner, or send the scheduling information to a plurality of second devices, including the second device, in a broadcast manner, and a format of the scheduling information is different based on whether the scheduling information is sent in the unicast manner or the broadcast manner; and performing, based on the scheduling information, the data transmission with the second device in the second frequency band by using the resource.

17. The non-transitory computer readable storage medium according to claim 16, wherein before sending scheduling information to the second device in the first frequency band, the computer is further caused to provide execution comprising:

determining the scheduling information based on at least one of:

uplink and downlink service information in a first basic service set to which the first device belongs;

a quantity of neighboring devices of the first device that support and/or are working in the second frequency band in a scheduling manner;

interference information in the first basic service set;

interference information between the first basic service set and a second basic service set; and a resource allocation rule between the first basic service set and the second basic service set, wherein the second basic service set comprises a basic service set that performs resource sharing with the first basic service set.

18. The non-transitory computer readable storage medium according to claim 17, wherein the resource allocation rule is that a resource used by the first basic service set does not exceed $1/(N+1)$th of a resource used for sharing, and N is a quantity of basic service sets that perform resource sharing with the first basic service set, and the resource allocation rule comprises any one of:

a bandwidth corresponding to the first basic service set does not exceed $1/(N+1)$th of a bandwidth used for sharing, a time corresponding to the first basic service set does not exceed $1/(N+1)$th of a time used for sharing, and a quantity of slots corresponding to the first basic service set does not exceed $1/(N+1)$th of a quantity of slots used for sharing.

19. The non-transitory computer readable storage medium according to claim 16, wherein the computer is further caused to provide execution comprising:

receiving second indication information from the neighboring device, wherein the second indication information comprises at least one of:

information configured to indicate that the neighboring device supports and/or is working in the second frequency band in a scheduling manner, and supports time synchronization information of the neighboring device, slot alignment information of the neighboring device and interference measurement information of the neighboring device.

20. The non-transitory computer readable storage medium according to claim 16, wherein the computer is further caused to provide execution comprising:

sending third indication information, wherein the third indication information comprises at least one of:

information configured to indicate that the first device supports and/or is working in the second frequency band in a scheduling manner, and supports time synchronization information of the first device, slot alignment information of the first device and interference measurement information of the first device.

* * * * *